United States Patent [19]
Wilson et al.

[11] Patent Number: 5,819,613
[45] Date of Patent: Oct. 13, 1998

[54] SAW MILL APPARATUS AND METHOD

[75] Inventors: Barry Wilson, Vidalia; John Sanders, Lyons, both of Ga.

[73] Assignee: Rayonier, Inc., Stamford, Conn.

[21] Appl. No.: 582,831

[22] Filed: Dec. 15, 1995

[51] Int. Cl.$^6$ ................................................. B26D 1/00
[52] U.S. Cl. .................. 83/13; 83/75.5; 83/367; 83/425.2; 83/435.2; 83/789; 83/800; 83/820
[58] Field of Search ............................ 83/820, 367, 800, 83/801, 788, 789, 731, 730, 435.2, 425.2, 794, 437, 56, 13, 39, 44, 45, 62, 63, 73, 74, 75.5, 365; 30/380; 144/357, 370, 398

[56] References Cited

U.S. PATENT DOCUMENTS

| | | | |
|---|---|---|---|
| 4,009,632 | 3/1977 | Detjen | 83/731 |
| 4,074,601 | 2/1978 | Warren et al. | 83/435.1 |
| 4,127,045 | 11/1978 | Blucher et al. | 83/820 X |
| 4,146,072 | 3/1979 | Detjen | 83/731 X |
| 4,152,960 | 5/1979 | Detjen | 83/435.2 |
| 4,185,672 | 1/1980 | Vit et al. | 83/367 X |
| 4,206,673 | 6/1980 | Detjen | 83/731 |
| 4,250,937 | 2/1981 | Detjen | 83/731 X |
| 4,338,986 | 7/1982 | Detjen | 83/731 X |
| 4,353,276 | 10/1982 | Ackerfeldt | 83/731 X |
| 4,363,254 | 12/1982 | Aizawa et al. | 83/800 |
| 4,558,614 | 12/1985 | Harris | 83/56 |
| 4,766,790 | 8/1988 | Harris | 83/56 |
| 4,920,846 | 5/1990 | Duginske et al. | 83/820 |
| 5,070,751 | 12/1991 | Harris | 83/62.1 |
| 5,208,760 | 5/1993 | Moriya | 83/820 X |

*Primary Examiner*—Maurina T. Rachuba
*Attorney, Agent, or Firm*—Whitman Breed Abbott & Morgan LLP; William J. Spatz

[57] ABSTRACT

Saw mill apparatus and method are disclosed which provide improved cutting of logs. The saw mill apparatus supports and advances a log towards the saw mill's saw assembly and cuts the log longitudinally by a pair of parallel band saws. Blade guides are mounted to the blades of each of the band saws and are movable along the blades toward and away from the log being cut. The diameter of the log is sensed at plural longitudinal positions thereof and the blade guides are displaced along the band saw blades in response to each of the sensed diameters so that the blade guides are continuously positioned in close proximity to the log while it is being cut.

21 Claims, 3 Drawing Sheets

SAW MILL APPARATUS AND METHOD

BACKGROUND OF THE INVENTION

The present invention relates to saw mill apparatus and method and, more particularly, to saw mill apparatus and method for cutting logs of constant and varying diameter using band saws and an improved band saw blade guide system.

In prior art saw mills, it is known to utilize a pair of circular saws or a pair of band saws to cut the sides of a log while it is advanced longitudinally through the saw system. It also is known in the art to utilize blade guides to stabilize lateral movement or "wobble" of the band saw blades while a log is being cut. Such blade guides restrict lateral movement of the blades and minimize stress on the blades.

One problem encountered in typical saw mill apparatus having band saws is that although such band saws generally utilize blade guides, such saw mills generally are unable to optimize cutting and are unable to prevent band saw blade wobble when logs of varying diameter are cut.

One prior art system which attempts to overcome this problem utilizes four photocells to detect the approximate diameter (or width) of a log and utilizes an "air-operated stack cylinder" to adjust the height of a blade guide of each band saw to one of four positions prior to cutting that log. The photocells are arranged on top of one another at a distance of 6 inches between adjacent photocells, and each of four light sources supplies a light beam to a respective photocell. Depending on the photocells that receive a light beam, the diameter of the log is ascertained to within a 6 inch range. Then, a four position air-operated stack cylinder establishes each blade guide to be located at that position (of the four positions) that is immediately above the detected range of the log's diameter. For example, if the photocells ascertain the log's diameter to be within the range of 12 to 18 inches, the position of each blade guide is set to the one of four positions that is at least 18 inches above the bottom surface of the log so as to prevent the log from hitting the guides.

One difficulty encountered in such prior art saw mill apparatus is its general inability to accurately saw a log which has substantially different diameters along the length thereof. That is, given a particular log having a diameter of, for example, 11 inches at one end and a diameter of 19 inches at its other end, the above-mentioned prior art saw mill may determine that the log has a diameter in a first range (e.g., the 6 to 12 inch range), or a diameter in a second range (e.g., the 12 to 18 inch range), or a diameter in a third range (e.g., the 18 to 24 inch range). Since this prior art apparatus selects only a single position of the blade guides for each log to be cut, either the blade guides will be located at a position too far above the log to provide an accurate cut thereof, or will be located at a position too low which would result in the hitting of the guides by the log, thereby damaging the guides. Furthermore, even if a particular log to be cut had a constant diameter throughout its entire length, the prior art apparatus still is capable of positioning the blade guides unacceptably too far from the log (e.g., 6 inches) to provide an accurate cut thereof.

OBJECTS OF THE INVENTION

Therefore, it is an object of the present invention to provide saw mill apparatus and method which overcome the shortcomings of the above-described devices.

Another object of the present invention is to provide saw mill apparatus and method which tracks the diameter of a log while it is being cut.

A further object of the present invention is to provide saw mill apparatus and method which displaces the band saw blade guides at positions which are in close proximity to the log throughout cutting thereof.

An additional object of this invention is to provide a saw mill apparatus which accurately senses the diameter of a log at plural longitudinal positions thereof so that the blade guides are able to continuously track the log as it is being cut.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, a sawmill apparatus includes an endless log carrier which supports a log, drive means for advancing the endless log carrier along a given path so as to advance the log supported thereby longitudinally through the saw mill's saw assembly, a band saw which includes a parallel endless band saw blade positioned in the path of the log and which cuts longitudinally the log moving through the apparatus, a blade guide which engages the band saw blade and which is mounted to the band saw in a manner that allows movement of the blade guide along the band saw blade toward and away from the log being cut, a sensing device which senses the diameter of the log at plural longitudinal positions thereof, and a blade guide displacer which displaces the blade guide along the band saw blade in response to the sensed diameters so that the guides are positioned in close proximity to the log while it is being cut.

As one aspect of the present invention, the blade guides are displaced plural times during the cutting of the log.

As another aspect of the present invention, the blade guides are positioned at a predetermined distance above the log throughout cutting thereof.

As yet a further aspect of the present invention, the diameter of the log is sensed at predetermined intervals along the length of the log.

As yet another aspect of the present invention, a scanner located upstream from the saw assembly supplies a sensed diameter of a particular longitudinal position of the log to a control device which controls the displacement of the blade guide at a time when that particular position of the log is proximally near the band saw.

In accordance with another embodiment of the present invention, sawmill apparatus includes an endless log carrier which supports a log, drive means for advancing the log carrier along a given path to advance the log supported thereby longitudinally through a saw assembly, a band saw which includes first and second parallel endless band saw blades that are both positioned in the path of the log and that cut longitudinally the log as it moves through the apparatus, a first blade guide which is engaged to the first band saw blade and which is mounted to the band saw in a manner that allows movement of the first blade guide along the first band saw blade toward and away from the log, a second blade guide which is engaged to the second band saw blade and which is mounted to the band saw in a manner that allows movement of the second blade guide along the second band saw blade toward and away from the log, a sensing device which senses the diameter of the log at a plurality of longitudinal positions thereof, and a blade guide displacer which displaces both the first and second blade guides in response to the sensed diameters so that they are positioned along the first and second bands at a predetermined distance from the log while it is being cut.

As an aspect of this invention, a first blade guide displacer displaces the first blade guide along the first band saw blade and a second blade guide displacer displaces the second blade guide along the second band saw blade.

In accordance with a further embodiment of the present invention, an improved method of cutting logs in a sawmill is carried out by advancing a log longitudinally towards a band saw apparatus, cutting the log longitudinally by a band saw blade while the log is advanced therethrough, guiding the band saw blade using a blade guide that is engaged thereto, and displacing the blade guide along the band saw blade a predetermined distance above the log while it is being cut.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
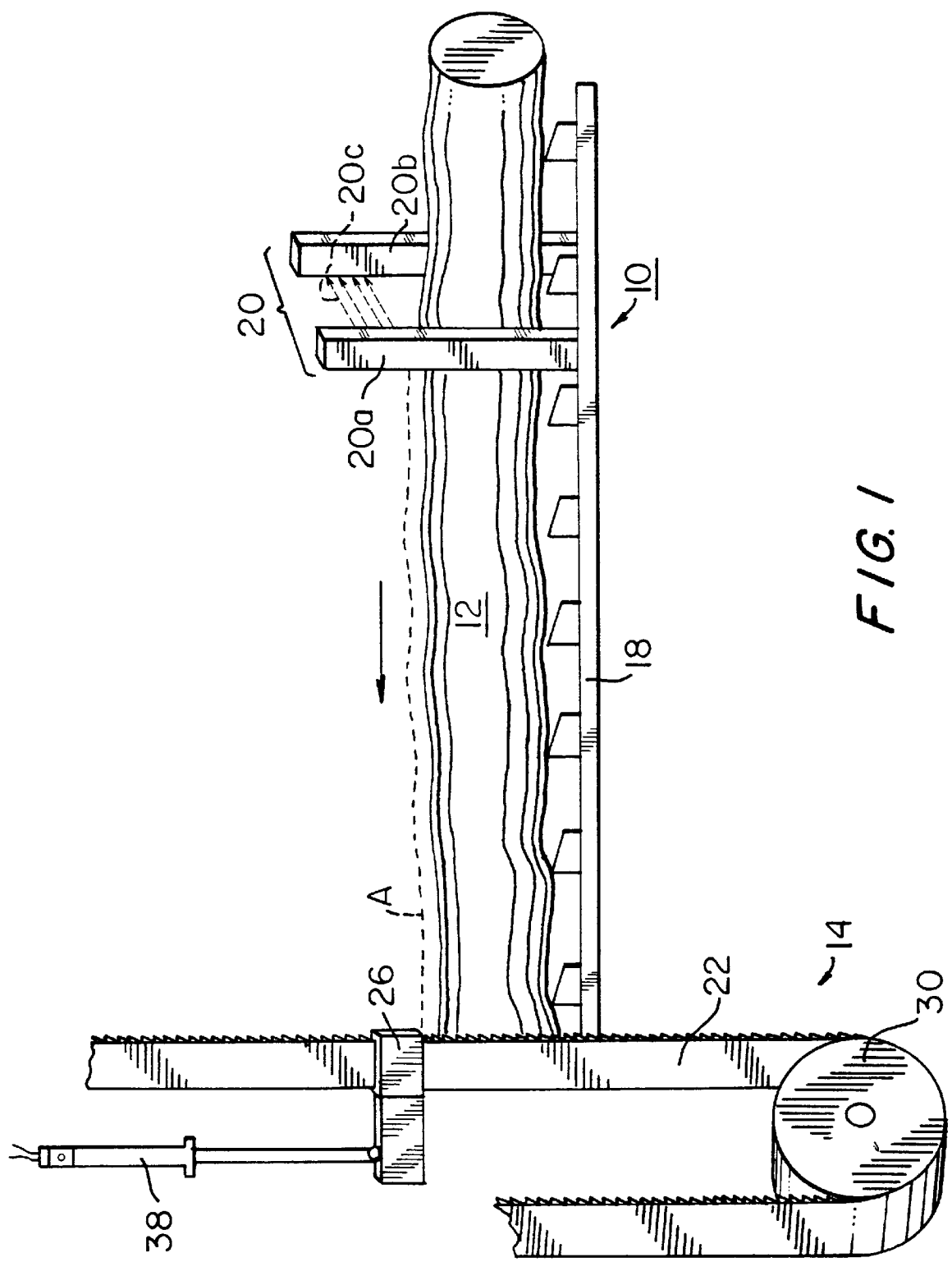
FIG. 1 is a partial side view of the saw mill apparatus in accordance with the present invention.
Figure 2:
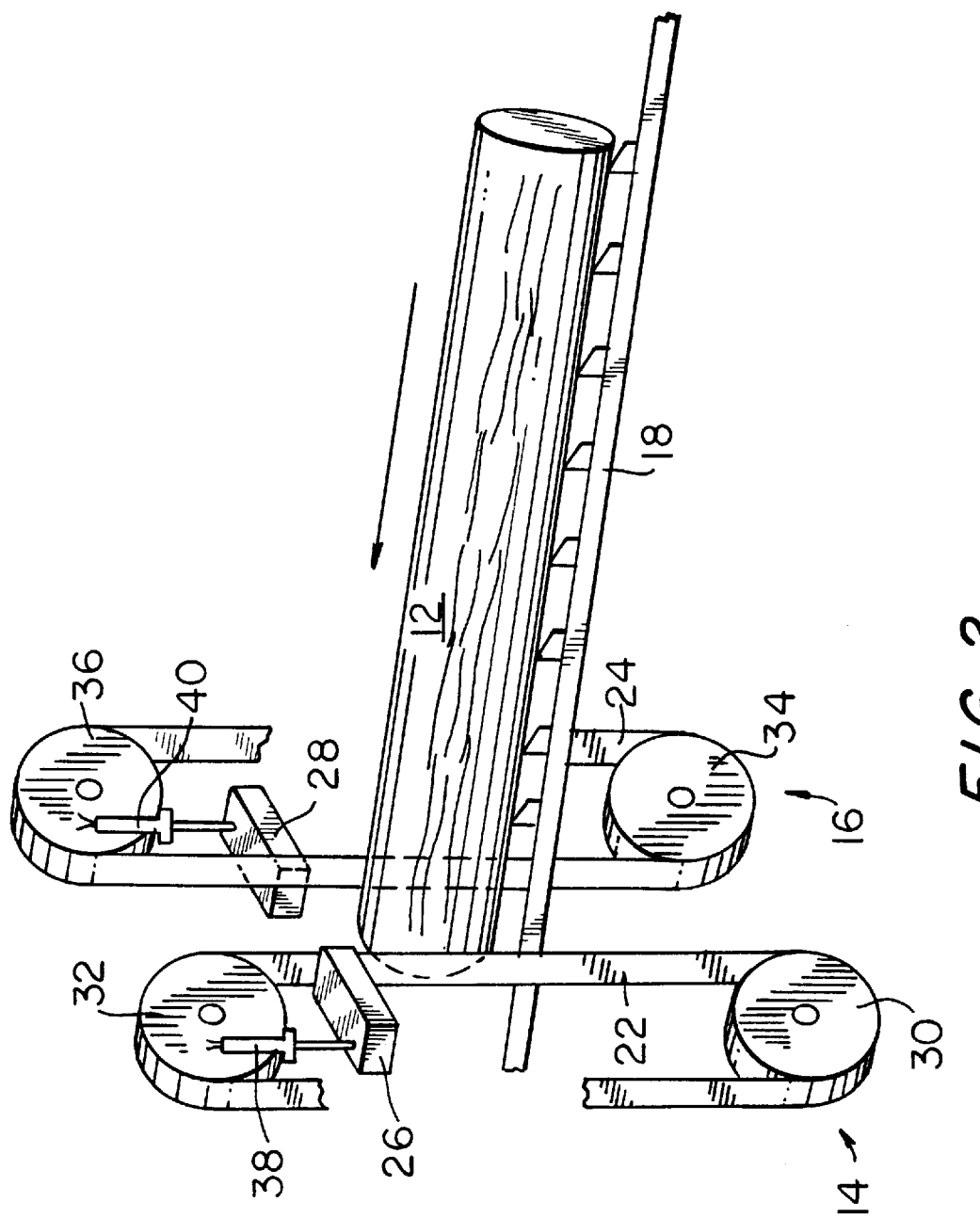
FIG. 2 is a three-dimensional expanded view of the band saw assembly of the present invention.

Referring now to the drawings, FIG. 1 is a partial side view of saw mill apparatus 10 in accordance with the present invention, and FIG. 2 is an expanded view of the saw assembly of the present invention. As shown in both FIGS. 1 and 2, a log 12 is advanced towards a saw assembly, which includes a first band saw 14 and a second band saw 16 (shown in FIG. 2), by a carrier 18 in the direction shown. Carrier 18 is, for example, a sharp chain or any other appropriate device which supports, orients, and advances a log to a saw assembly. Such a log carrying device is well-known in the art, for example, such as disclosed in U.S. Pat. No. 4,250,937, issued to Detjen on Feb. 17, 1981, or U.S. Pat. No. 4,206,673, issued to Detjen on Jun. 10, 1980, which are incorporated herein by reference, and therefore, further description thereof is omitted herein except where necessary for an understanding of the present invention.

Prior to being cut, log 12 is advanced past a scanning device 20 which ascertains, at a ¼ inch resolution, the diameter (or width) of the log every 4 inches longitudinally. Scanning device 20 includes a beam array emitter unit 20a which emits a Beam array 20c to a receiver unit 20c. Beam array 20b converts the received beam (i.e., that part of the beam that is not blocked by log 12) into a signal representative of the diameter of log 12. It is appreciated that other suitable devices that accurately detect the height (i.e., diameter) of a log and that are known in the art may be used herein.

As log 12 is advanced on carrier 18 towards the saw assembly, scanning device 20 is controlled by an appropriate control system (not shown) to detect the diameter of the log every 4 inches of travel, or alternatively, is controlled to detect the diameter of log 12 at predetermined intervals of time (e.g., every 0.25 second). The detected diameters are supplied via a control signal (not shown) to the control system which then operates to control the height of first and second blade guides 26, 28 (to be discussed) so that the guides properly track the diameter of log 12 as it advances through the assembly.

As previously stated, the saw mill's saw assembly includes first and second band saws 14, 16. First and second band saws 14, 16 include respective first and second band saw blades 22, 24 which are supported on their respective wheels or pulleys 30, 32, 34 and 36, and means are provided for rotating the wheels in a conventional manner to cause the band saws to cut log 12 as it is advanced longitudinally therethrough. Log 12 is thereby cut in a conventional manner. That is, the sides of log 12 are cut by the adjacent vertical portions of first and second band saw blades 22, 24 which produces two slabs and a center hard piece which is known in the art as a flitch or cant. The saw assemblies are preferably shifting saws for producing a center piece having an adjustable thickness, and since the shifting of first and second band saws 14 and 16 is well known in the art, further description thereof is omitted.

First and second blade guides 26 and 28 are mounted to band saws 14 and 16, respectively, by means of hydraulic positioners 38 and 40. It is appreciated, however, that other types of suitable positioning devices may be used herein to position first and second blade guides 26 and 28. Fixed blade guide assemblies (not shown) are utilized to engage first and second band saw blades 22 and 24 at a position immediately below log 12. Fixed blade guides are well known in the art and form no part of the present invention.

Control signals indicative of the diameter of various positions of log 12 are supplied from the control system to hydraulic positioners 38 and 40 so as establish the height (i.e., position) of first and second blade guides 26 and 28 on first and second band saw blades 22 and 24, respectively, in accordance with the present invention.

Figure 3:
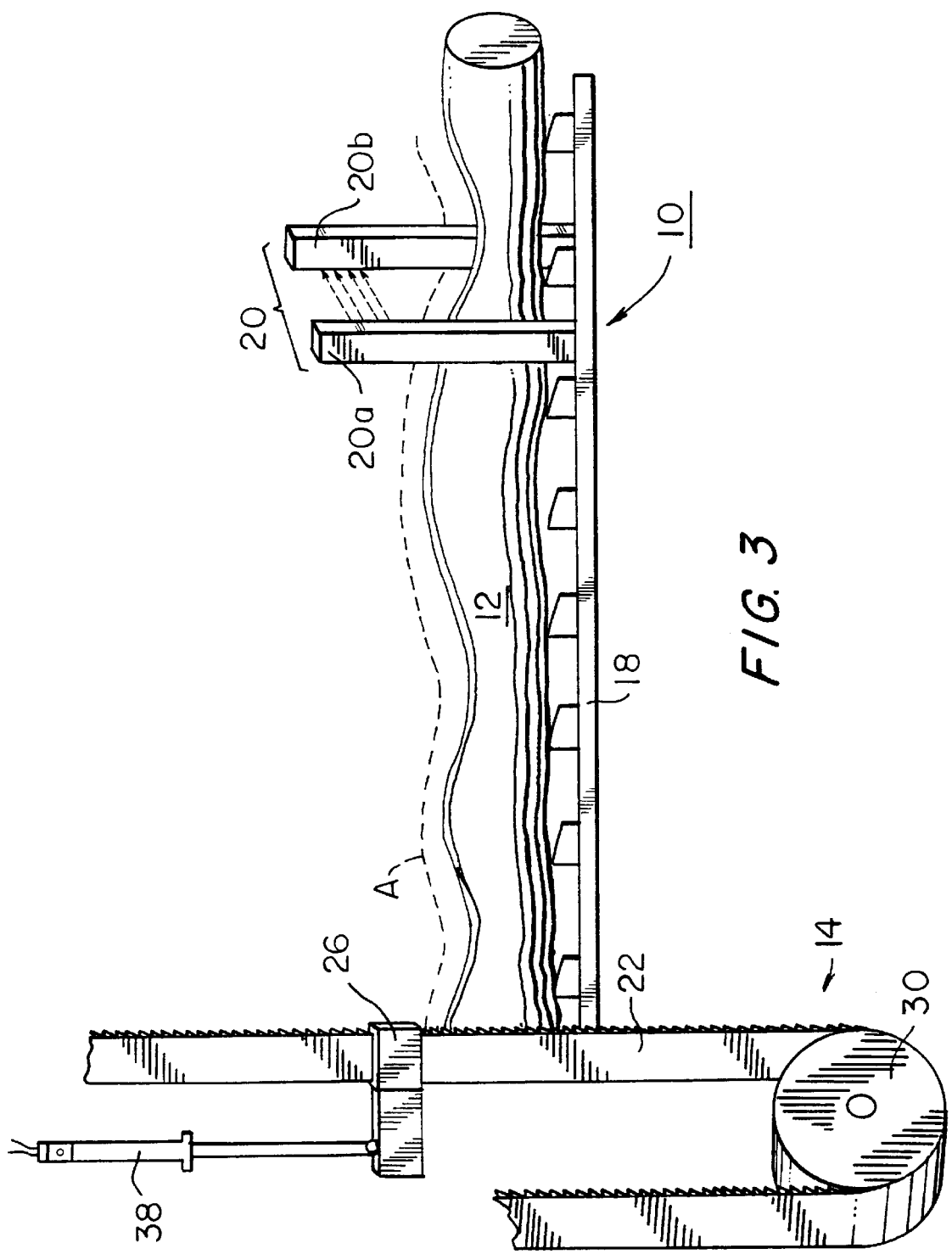
FIG. 3 is another side view of the saw mill apparatus of the present invention.

A description of the displacement of first and second blade guides 26 and 28 on first and second band saw blades 22 and 24, respectively, so that they track the width of log 12, in accordance with the present invention, will now be described with reference to FIG. 3 of the drawings. As can be appreciated, FIG. 3 is quite similar to FIG. 1 except the diameter of log 12 is shown to substantially change throughout its length. As various portions of log 12 (e.g., every 4 inches along the log) are advanced past scanning device 20, the diameter of the log is detected and supplied to the control system. Then, at the appropriate time, blade guide 26 is displaced, by means of hydraulic positioner 38, to a position on band saw blade 22 that is approximately 3 inches above the log. Since scanning device 20 has a ¼ inch resolution and the diameter of log 12 is measured at least approximately every 4 inches, blade guide 26 properly tracks log 12 along a track path "A". Thus, log 12 is accurately cut and, in addition, the strain on blade 22 is minimized. Similarly, blade guide 28 tracks log 12 by establishing a position that follows path "A". It is seen, therefore, that although log 12 has substantially different diameters along its length, blade guides 26 and 28 accurately track the log by being positioned at a relatively short distance from the top surface of the log, but are not placed too low so as to risk the possibility of being damaged by any contact between the guides and the log.

In an alternative embodiment of the present invention, first and second blade guides 26 and 28 are coupled together to ensure that they are positioned at the same height relative to log 12. However, FIG. 2 illustrates the preferred embodiment of the invention wherein first and second blade guides 26 and 28 are positioned by respectively different hydraulic positioners 38 and 40.

While the present invention has been particularly shown and described in conjunction with a preferred embodiment thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above and all equivalence thereto.

What is claimed is:

1. A saw mill apparatus comprising:
   an endless log carrier for supporting and advancing a log along a given path longitudinally through a saw assembly;
   a band saw including a parallel endless band saw blade positioned in the path of said log and for cutting longitudinally said log moving through said apparatus;
   a blade guide for guiding said band saw blade, said blade guide being mounted to said band saw;
   sensing means for sensing a diameter of said log at a plurality of longitudinal positions; and
   blade guide displacement means for displacing said blade guide along said band saw blade in response to the sensed diameters and for positioning said blade guide in close proximity to said log for minimizing blade wobble throughout cutting of the log.

2. The saw mill of claim 1, wherein said band saw includes a second parallel endless band saw blade positioned in the path of said log and for cutting longitudinally said log moving through said apparatus, said band saw blade and said second band saw blade being parallel to one another and being separated by a space; said saw mill further comprising a second blade guide for guiding said second band saw, said second blade guide being mounted to said band saw blade, and said second blade guide being movable along said second band saw blade toward and away from said log being cut.

3. The saw mill of claim 2, further comprising second blade guide displacement means for displacing said second blade guide along said second band saw blade in response to the sensed diameters and for positioning said second blade guide in close proximity to said log throughout cutting of the log.

4. The saw mill of claim 2, wherein said blade guide displacement means further displaces said second blade guide along said second band saw blade in response to the sensed diameters so that the blade guide and second blade guide are positioned at approximately a same transverse position with respect to a position of the log.

5. The saw mill of claim 1, wherein said blade guide displacement means positions said blade guide at a predetermined distance above said log throughout cutting of the log.

6. The saw mill of claim 5, wherein said predetermined distance is substantially 3 inches.

7. The saw mill of claim 1, wherein said sensing means senses the diameter of said log at predetermined intervals along a longitudinal length of said log.

8. The saw mill of claim 1, wherein said sensing means senses the diameter of a log substantially every 6 inches along the longitudinal length of said log.

9. The saw mill of claim 1, wherein said sensing means is a scanner coupled to said saw mill apparatus at a position along said given path preceding said saw assembly; said saw mill further comprising control means for supplying to said blade guide displacement means a control signal corresponding to a sensed diameter of a certain position of said log at a time corresponding to when said certain position of said log is proximally near said band saw.

10. The saw mill of claim 9, wherein said scanner senses the diameter of said log at a substantially 0.25 inch resolution.

11. The saw mill of claim 1, wherein said endless log carrier is a chain.

12. The saw mill of claim 9, wherein said scanner comprises a beam array emitter.

13. A saw mill apparatus, comprising:
    an endless log carrier for supporting and advancing a log along a given path longitudinally through a saw assembly;
    a band saw including first and second parallel endless band saw blades both positioned in the path of said log and for cutting longitudinally said log moving through said apparatus;
    a first blade guide for guiding said first band saw blade, said first blade guide being mounted to said band saw, and said first blade guide being movable along said first band saw blade toward and away from said log being cut;
    a second blade guide for guiding said second band saw blade, said second blade guide being mounted to said band saw, and said second blade guide being movable along said second band saw blade toward and away from said log being cut;
    sensing means for sensing a diameter of said log at a plurality of longitudinal positions of the log; and
    blade guide displacement means for displacing said first and second blade guides along said first and second band saw blades, respectively, in response to the sensed diameters for positioning said first and second blade guides at a predetermined distance from the log for minimizing wobble of said first and second band saw blades throughout cutting of the log.

14. The saw mill of claim 13, wherein said blade guide displacement means displaces said first and second blade guides a plurality of times during the cutting of said log.

15. The saw mill of claim 13, wherein said blade guide displacement means includes first means for displacing said first blade guide along said first band saw blade in response to the sensed diameters and second means for displacing said second blade guide along said second band saw blade also in response to the sensed diameters.

16. The saw mill of claim 13, wherein said blade guide displacement means displaces said second blade guide at approximately a same transverse position of said log as said first blade guide.

17. The saw mill of claim 13, wherein said sensing means senses the diameter of said log at predetermined intervals along a longitudinal length of said log.

18. The saw mill of claim 13, wherein said sensing means is a scanner coupled to said saw mill apparatus at a position along said given path preceding said saw assembly; said saw mill further comprising control means for supplying to said blade guide displacement means a control signal corresponding to a sensed diameter of a certain position of said log at a time corresponding to when said certain position of said log is proximally near said band saw.

19. Method of cutting logs in a saw mill, comprising the steps of:
    advancing a log longitudinally towards a band saw apparatus;

cutting said log longitudinally by a band saw blade of said band saw apparatus while said log is advanced through the band saw apparatus;

guiding said band saw blade during cutting of said log using a blade guide engaged to said band saw blade; and displacing said blade guide along said band saw blade a predetermined distance above said log for minimizing blade wobble during cutting of the log.

20. The method of claim 19, wherein the step of displacing said blade guide is carried out a plurality of times during the cutting of said log.

21. The method of claim 19, further comprising the step of sensing a diameter of said log at predetermined intervals along a longitudinal length of the log; and said step of displacing said blade guide is carried out at each of said predetermined intervals of said log.

* * * * *